United States Patent [19]

Fassbender

[11] 4,306,840
[45] Dec. 22, 1981

[54] AUTOMATIC CONNECTING VALVE FOR HYDRAULIC SYSTEMS

[75] Inventor: Rolf Fassbender, Mutlangen, Fed. Rep. of Germany

[73] Assignee: Zahnradfabrik Friedrichshafen, AG., Friedrichshafen, Fed. Rep. of Germany

[21] Appl. No.: 41,885

[22] Filed: May 23, 1979

[30] Foreign Application Priority Data

Jun. 10, 1978 [DE] Fed. Rep. of Germany ....... 2825578

[51] Int. Cl.$^3$ ............................................. F04B 49/00
[52] U.S. Cl. ..................................... 417/286; 137/118
[58] Field of Search ................. 417/286, 300; 60/405; 137/118, 117, 111

[56] References Cited

U.S. PATENT DOCUMENTS

| 3,882,678 | 5/1975 | Fassbender | 417/286 |
| 4,002,027 | 1/1977 | Eley et al. | 417/286 |
| 4,116,577 | 9/1978 | Lauck | 417/286 |

Primary Examiner—Billy S. Taylor
Attorney, Agent, or Firm—Zalkind & Shuster

[57] ABSTRACT

A differential pressure actuated valve is displaced from a spring-biased, stabilized position to a stabilized pump-changeover position in response to increasing pump pressure. The valve actuating pressure is varied in both directions of valve movement between the stabilized positions by variation of the restriction passage flow area through which the pressure differential is developed for actuating the valve.

13 Claims, 6 Drawing Figures

AUTOMATIC CONNECTING VALVE FOR HYDRAULIC SYSTEMS

BACKGROUND OF THE INVENTION

This invention relates to a valve assembly for controlling the supply of pressurized fluid to a fluid operated device, such as a fluid steering system from a main pump and a reserve pump.

Hydraulic steering systems are provided with a reserve pump in order to enhance operational safety. Automatic pump connecting valves are provided in such systems to assure the supply of fluid from the reserve pump in case the output of the main pump drops below a predetermined value. Such an automatic reserve pump connecting valve is disclosed, for example, in U.S. Pat. No. 3,882,678, wherein, the connection of the reserve pump to the fluid operated device is effected by producing a pressure differential between two pressure chambers of a valve actuator for the connecting valve.

In the foregoing type of pump changeover valve assembly, partial malfunction of the main pump results in slow displacement or "creep" of the valve toward its pump changing position. It is, therefore, an important object of the present invention to provide a valve assembly for two pumps alternately supplying fluid to a fluid operated device, wherein pump changeover occurs as a result of accelerated approach of, valve piston to its pump changeover position even against high opposing forces with minimal hysteresis and no momentary hangup.

A further object, in accordance with the foregoing object is to provide a valve assembly wherein operational overlap between the two pumps is prevented.

Yet another object of the present invention is to provide a valve assembly through which a pump changeover is effected without the functional disadvantages that would otherwise occur because of over-dimensioning of the valve passages in the valve assembly.

SUMMARY OF THE INVENTION

In accordance with the present invention, two pumps supplying pressurized fluid to a fluid operated device, are controlled by an automatic valve assembly having a differential pressure type valve actuator and a variable flow area flow control means interconnecting one of the pumps with the valve actuator to regulate the pump change-over action of a single connecting valve piston in the valve assembly.

A pressure resistance valve section may be incorporated in the valve assembly to prevent fluctuations in pressure of the fluid from the pump supplying the valve actuator, because of pump wear, unloading of the fluid pressure operated device or continuous pump change-over action of the valve assembly.

The invention will be especially useful for fluid operated devices that require a minimum flow of fluid so that the changeover action of the valve assembly is dependent on the outflow rate of a main pump supplying the valve actuator.

The flow control means is connected between the main pump and the pressure resistance valve section within one of the opposing pressure chambers forming the differential pressure valve actuator. The variable flow area of the flow control means is therefore established within said one of the pressure chambers between a radially outer orifice member and an inner control assembly respectively mounted by the valve body and the valve piston for relative axial displacement. Initial displacement of the inner control assembly by pump pressure produces a maximum reduction in flow area of the restricted passage through which a differential valve actuating pressure is developed until axial displacement of the valve piston occurs. After initial displacement of the valve piston, the restricted flow area is increased in steps under a continued increasing pump pressure until a stabilized pump changeover position is reached. The valve piston is returned to its spring biased position under a decreasing pump pressure with a hysteresis characteristic occasioned by an increase in the flow area of the restricted passage following an initial decrease. As a result of the foregoing flow area variations, the valve piston is stablized only in two operative positions and is accelerated as it moves under the variable influence of pump pressure to avoid "creep" and "hangup" of the valve assembly under valve shift conditions.

BRIEF DESCRIPTION OF DRAWING FIGURES

The specific embodiments hereinafter described by way of example make reference to the accompanying drawings in which.

DETAILED DESCRIPTION OF SPECIFIC EMBODIMENT

Figure 1:
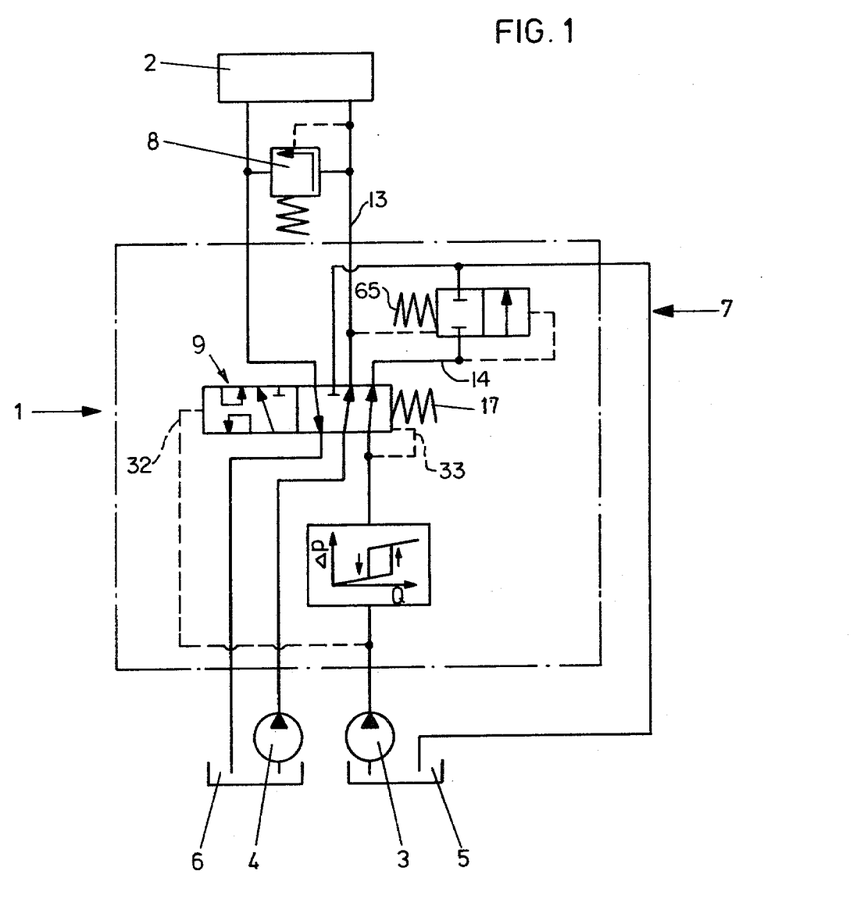
FIG. 1 is a schematic fluid circuit diagram incorporating a connecting valve assembly in accordance with the invention between a fluid operated device and a pair of pumps.

Referring now to the drawings in detail, FIG. 1 schematically illustrates a valve assembly 1 for controlling the flow of fluid to a fluid operated device 2, such as a vehicle steering system. The fluid under pressure supplied to the fluid operated device originates from a main pump 3 and a reserve pump 4 and a differential pressure produced by the output of the main pump assures pump changeover operation of the valve assembly in both directions of pump switching.

The valve assembly 1 comprises a two-position valve section 9 having seven ports as schematically shown in FIG. 1. In the neutral position of the valve assembly as shown, the fluid output of the reserve pump 4 is conducted to the fluid operated device 2 while return fluid from the fluid operated device is conducted to a fluid storage tank 6 associated with the reserve pump. The fluid discharge from the main pump 3 in the neutral position is conducted by valve section 9 in bypass relation to the fluid operated device for return to a fluid storage tank 5 associated with the main pump through an additional pressure resistance valve section 7 which may be physically separated from or built into the valve section 9 as hereinafter described. The pressure resistance valve section 7 functions to control operation of the main pump 3 so that during all operational modes the pump 3 operates against the same pressure level established by the fluid operated device 2. The valve section 7 will therefore prevent pressure fluctuations in the fluid discharge stream of the main pump that may otherwise occur because of intermittent unloading of the fluid pressure operated device from the fluid circuit. Such pressure fluctuations often occur as a result or wear in the main pump. A pressure safety valve 8 is also provided as shown in FIG. 1 to protect the fluid pressure operated device 2 from damage as a result of excessive pressure peaks.

In the other operative position of the valve assembly, from that shown in FIG. 1, the fluid discharge of the main pump 3 is conducted through the fluid pressure operated device 2 for return therefrom through the valve section 9 into the fluid storage tank 5. The fluid discharge stream from the reserve pump 4 in such position of the valve section 9 bypasses the device 2 and is directly returned to the tank 6.

Figure 2:
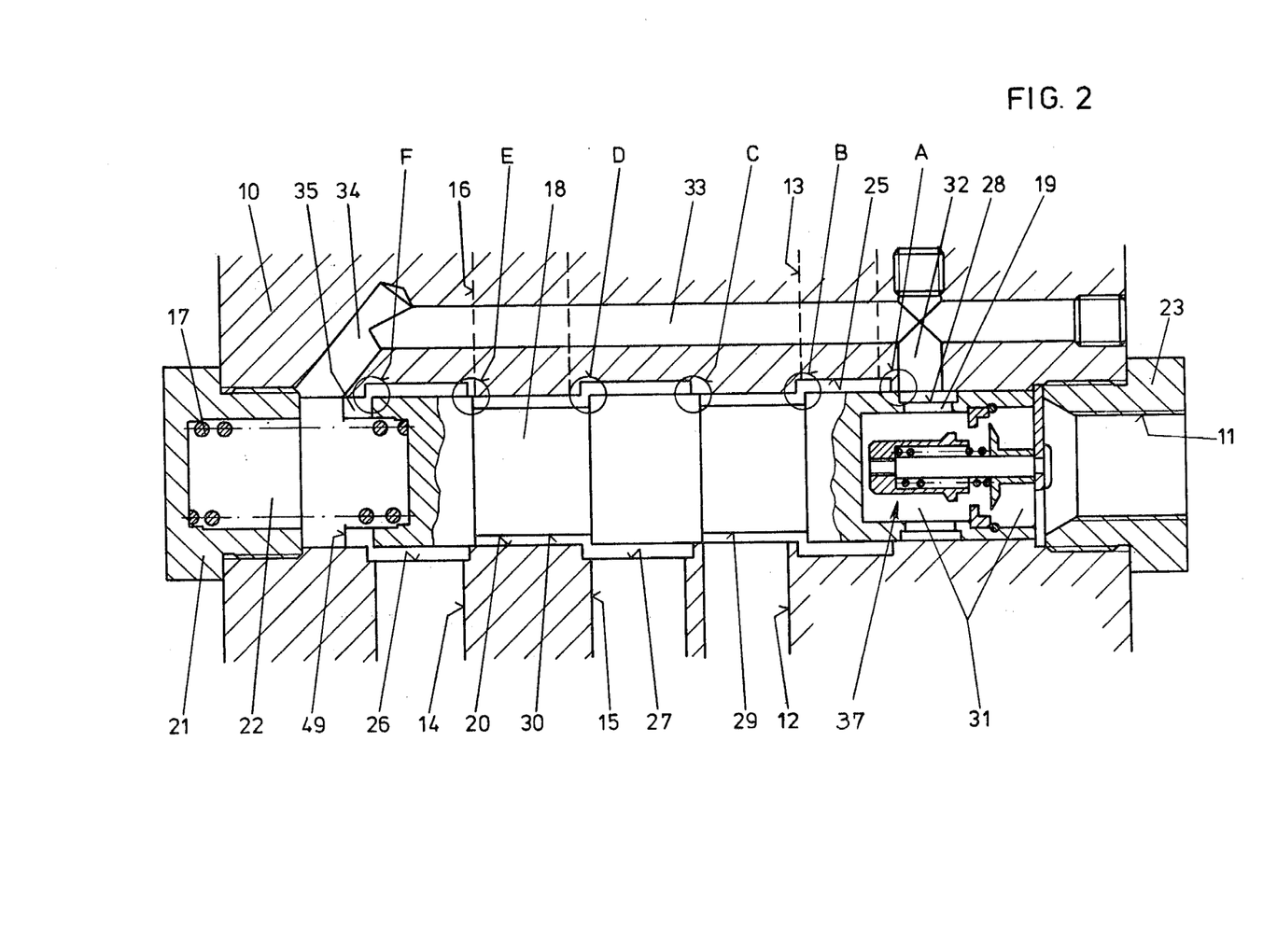
FIG. 2 is a side sectional view through a specific embodiment of the valve assembly depicted in FIG. 1.

FIG. 2 illustrates a specific embodiment of the valve section 9 including a valve body 10 having an inlet port connection 11 to the main pump 3, an inlet port connection 12 to the reserve pump 4, an outlet port connection 13 (shown by dotted line) to the fluid operated device 2, a discharge port connection 14 to the tank 5 associated with the pump 3 through the pressure resistance valve section 7 described in connection with FIG. 1, and a discharge port connection 15 connected to the tank 6 associated with the reserve pump 4. The fluid return conduit from the fluid operated device 2 is connected to the valve through port connection 16 shown in dotted line. A valve piston 18 is displacably mounted within a bore 20 formed in the valve body 10 and is biased in one axial direction by a spring 17. The bore 20 at one axial end of the valve body is closed by a threaded cap 21 enclosing a spring chamber 22, within which one end of the spring 17 is seated. The other axial end of the bore 20 is closed by a threaded cap 23 through which the inlet connection 11 from the main pump 3 is formed. The port connections 13, 14 and 15 respectively communicate with the valve bore 20 through annular control grooves 25, 26 and 27 formed in the valve body. The inlet connection 11 from the main pump 3 is in fluid communication with the spring chamber 22 through a passage developing a pressure differential, including a flow restricting chamber 31 in valve piston 18, radial bores 19 extending from the chamber 31 to an annular groove 28 on the valve piston 18, and bores 32, 33 and 34 formed in the valve body 10 in series with each other to conduct fluid from the chamber 31 to the spring chamber 22. The valve piston 18 is also provided with slots 35 communicating with the spring chamber 22 through which fluid is conducted from the spring chamber 22 into the control groove 26 associated with the discharge port connection 14, in the neutral position of the valve as shown in FIG. 2. The chambers 31 and 22 thus form part of a differential pressure type of fluid valve actuator for the valve section 9.

At the location of port connections 12 and 16, the valve piston 18 is formed with annular grooves 29 and 30. The control grooves 25, 26 and 27 formed in the valve body 10, cooperate with the annular grooves 28, 30 and the slots 35 in the valve piston 18 to form valve passages at A, B, C, D, E, and F. In the neutral position of the valve piston 18 to which it is biased by spring 17, as shown in FIG. 2, fluid from the reserve pump 4 enters the inlet port connection 12 and is conducted through opened valve passage B to the port connection 13 supplying the fluid to the fluid operated device 2. The return of fluid from the device 2 at port connection 16 is conducted through opened valve passage D to the port connection 15 for return to the tank 6 of the reserve pump 4. The fluid output of the main pump 3 enters port connection 11 and is conducted through chamber 31, bores 32, 33 and 34, the spring chamber 22 and the opened valve passage F to the port connection 14 for return to the tank 5 of the main pump. The valve passages A, C, and E are then closed.

Figure 3:
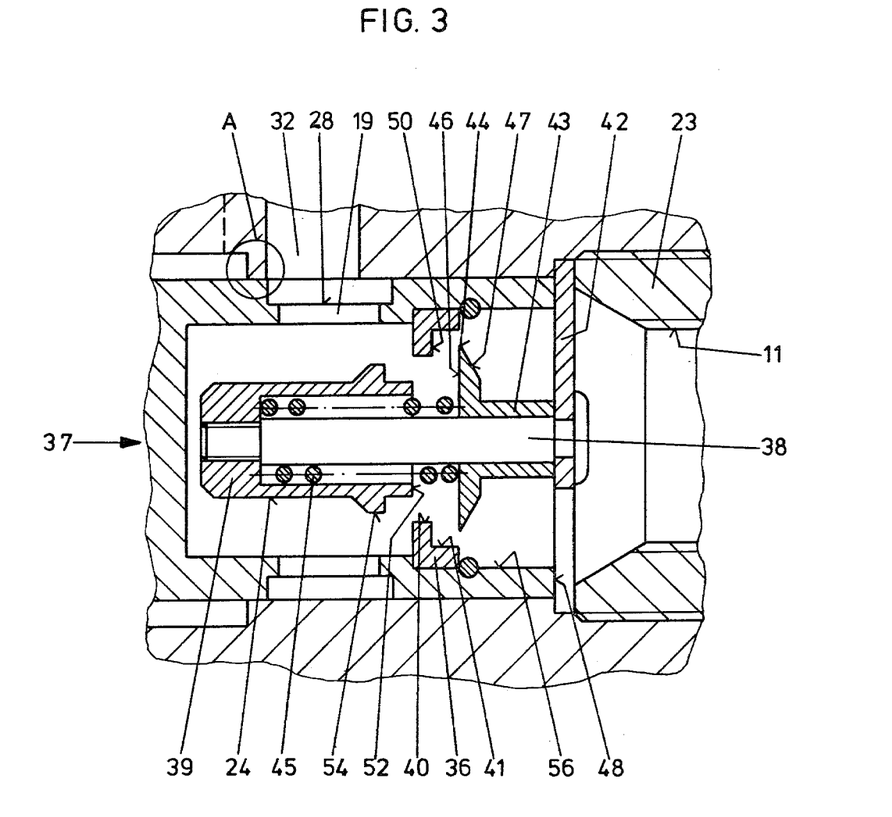
FIG. 3 is an enlarged side sectional view illustrating a flow restriction portion of the valve assembly shown in FIG. 2.

A change in fluid flow paths is effected by displacement of the valve piston 18 in response to a differential pressure developed by a flow control assembly 37 as more clearly seen in FIG. 3. The assembly 37 includes a flow orifice member 36 fixed to the valve piston having small and large internal diameter surfaces 40 and 41, a support pin 38 to which a sleeve 39 is fixed at one axial end having an outer diameter surface 24, and a star-shaped disk 42 connected to the body 10 from which the pin 38 extends into the chamber 31. A sleeve 43 having a disc 44 at one end is axially movable on the pin 38 and is biased against the disk 42 by a spring 45 supported inside of the sleeve 39. As the output pressure of the main pump 3 increases from zero, the pump medium entering the inlet port connection 11 is conducted through a restricted flow passage formed between the large diameter surface 41 of the member 36 and the outer surface of disc 44. The differential pressure so developed on the downstream and upstream sides 46 and 47 of the disc 44, also acts on the upstream side 48 of the valve piston 18 and the downstream side 49 thereof through the bores 32, 33 and 34. The springs 17 and 45 are designed so that when the force resulting from the pressure differential applied to the disc 44 exceeds the prestress force of the spring 45 to shift the sleeve 43 against the bias of spring 45, the differential pressure then applied to the valve piston 18 is insufficient to displace it from the neutral position at which it is held by the stronger bias of spring 17.

Whenever the downstream side 46 of the disc 44 approaches a transverse plane surface 50 of the member 36, the resulting reduction in flow area of the flow passage between the plane surface 50 and the disc 44 will increase the pressure differential applied to disc 44. This increase in pressure differential, causes further approach of the disc 44 to the plane surface 50, accompanied by a steep rise in the pressure differential on the disc 44. Since the pressure differential referred to is also applied to the valve piston 18 by virtue of the fluid communication established by bores 32, 33 and 34 as aforementioned. The position of the valve piston becomes unstable when the force resulting from the differential pressure thereon exceeds the prestress force of the spring 17 since displacement of the valve piston tends to enlarge the flow area of the restricted passage between member 36 and disc 44. Any resistances opposing a shift of the valve piston against the bias of the spring 17 will be overcome by the full pressure of the main pump since the differential pressure on the disc 44 increases to a maximum as the downstream side 46 of the disc 44 contacts the plane surface 50 of member 36. Accordingly, a safe and rapid shift of valve piston 18 against the bias of spring 17, is forceably achieved.

After the disc 44 and valve piston 18 are both displaced against the bias of their springs 45 and 17, the disc 44 engages the end surface 52 of the sleeve 39. The small internal diameter surface 40 of the member 36 will then approach the outer diameter surface of formation 54 on the sleeve 39 as a result of continued axial displacement of the valve piston 18 relative to sleeve 39. The restricted flow area formed between the internal diameter surface 40 of the member 36 and the outer diameter surface of the formation 54 is somewhat smaller than the restricted flow area between the outer diameter surface of the disc 44 and the large internal diameter surface 41 of member 36. The valve piston 18 continues to shift against the increasing bias of the spring 17 until the surface 40 of member 36 reaches the transition between the formation surface 54 and the smaller diameter surface portion 24 of the sleeve 39. The valve piston therefore reaches a stable pump changeover position because of the decrease in the flow restriction between the sleeve 39 and member 36. Any increase in pressure of the fluid from the main pump will further increase the flow area between the member 36 and the sleeve 39 as the valve piston 18 continues to shift against the increasing bias of the spring 17.

The location of the transition between the formation 54 and the small diameter surface portion 24 of the sleeve 39 is important for the functioning of the flow control assembly 37. The location is such that the disc 44 when contacting the front surface 52 of sleeve 39 will be axially aligned with the internal diameter portion 56 of the valve piston. The differential pressure then applied to the disc 44 will be determined by the flow area between the disc 44 and the internal diameter surface 56. The latter differential pressure will be so small that the resulting force on the disc 44 will be less than the prestress force of the spring 45. The spring 45 will then displace the sleeve 43 back to its initial position engaging the disc 42. The valve piston 18 will then be held in its axially shifted position by the pressure differential produced in the restricted passage formed between member 36 and the surface 24 of the sleeve 39.

In the axially shifted position of the valve piston, the fluid from main pump 3 is conducted from connection 11 through the restricted passage of assembly 37, the radial ports 19, and the opened valve passage A to the port connection 13 leading to the fluid operated device 2. The fluid returning from the device 2 is conducted through port connection 16, the opened valve passage E to the port connection 14 leading to the tank 5 of the main pump. The pressure fluid from the reserve pump 4 is conducted through the port connection 12, the open valve passage C to the port connection 15 leading to the tank of the reserve pump. The valve passages B, D and F are then closed.

When the outflow from the main pump decreases, the valve piston 18 is shifted back to the position shown in FIG. 3 toward the disc 42. The small internal diameter surface 40 of member 36 is therefore axially displaced away from axial alignment with the formation 54 on the sleeve 39 so as to enlarge the flow area of the restricted passage formed within the chamber 31. Such enlargement of the restricted flow area produces a rapid drop in the pressure differential applied to the valve piston 18 causing it to accelerate toward its initial position as shown in FIGS. 2 and 3.

Figure 4:
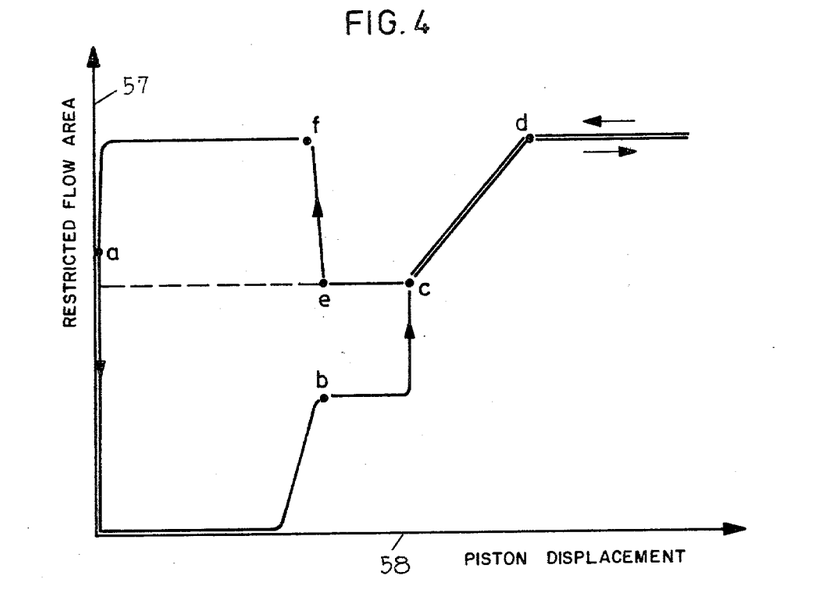
FIG. 4 is a graphical illustration of the relationship between the passage restriction flow area and valve piston displacement for the valve assembly illustrated in FIGS. 1–3.

FIG. 4 graphically illustrates the change in flow area of the restricted flow passage along ordinate 57 as a function of valve piston displacement along abscissa 58. Point (a) on the graph represents an initial flow area of the restricted passage formed between the large diameter surface 41 of the member 36 and the disc 44 of the axially displaceable sleeve 43. The flow area decreases towards zero as shown in FIG. 4 as the disc 44 approaches the plane surface 50 while the pressure of the main pump is insufficient to overcome the bias of spring 17 and cause axial displacement of the valve piston. At point (b) in FIG. 4, the disc 44 engages the front surface 52 of the sleeve 39, but is no longer in contact with the plane surface 50 of member 36 in view of valve piston displacement. The small diameter surface 40 of the member 36 is then axially aligned with the formation 54 on the sleeve 39. In such position, two restricted passages are formed in series resulting in an effective flow area corresponding to point (b) in FIG. 4. After the sleeve 43 is again returned to its initial position by spring 45, the flow area between surface 40 of member 36 and the formation 54 axially aligned therewith, alone determines the passage flow area represented by point (C) in FIG. 4. The position of the valve piston 18 corresponding to the flow areas depicted by points (a) to point (C) is unstable because of the variable factors involved. If the output pressure of the main pump increases, the flow area of the restricted passage increases up to point (d) as shown in FIG. 4, at which point the flow area is no longer dependent upon the position of the valve piston. The flow area of the restricted passage is then determined by the relationship between the surface 40 of the member 36 and the surface 24 of the sleeve 39.

Whenever the pressure output of the main pump decreases again, the flow area of the restricted passage decreases from point (d) to point (C). Between points (C) and (e), the flow area of the restricted passage remains constant during piston displacement as the main pump pressure decreases. The latter condition is determined by the relationship between the surface 40 and the outer surface of the formation 54. Continued decrease in the pressure output of the main pump results in an increase in flow area from the intermediate value at point (e) to a peak value depicted by point (f) in FIG. 4 corresponding to the passage formed between surface 40 and the small diameter surface portion 24 of the sleeve 39. Thus, the position of the valve piston 18 becomes unstable between points (e) and (a) during the decrease in main pump pressure. The differences in flow area that occur between (e) and (a) will determine the hysteresis characteristics with which the piston valve 18 shifts.

Figure 5:
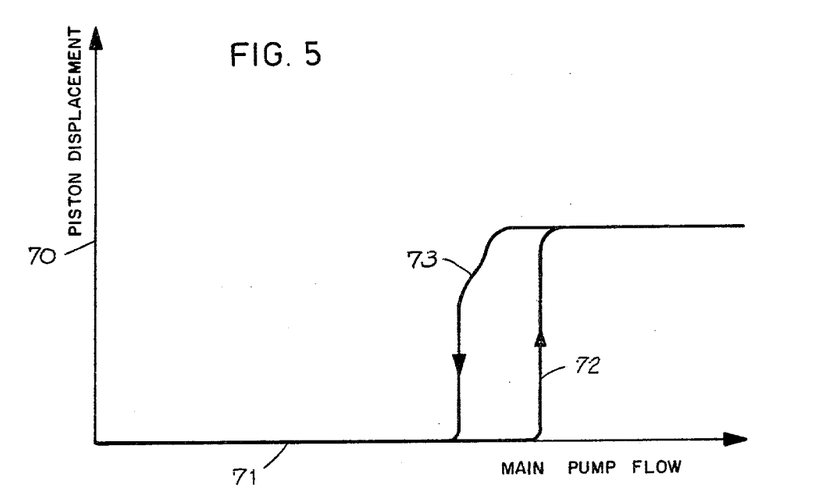
FIG. 5 is a graphical illustration showing the valve movement hysteresis characteristic for the valve assembly.

FIG. 5 graphically illustrates the flow rate characteristics associated with the aforementioned valve operation. The outflow characteristic curve 72 of the main pump shown in FIG. 5 produces a fluid flow rate measured along ordinate 70 in FIG. 5 that varies with valve piston displacement measured along abscissa 71 corresponding to the variation in restricted passage flow area between points (a) and (c) depicted in FIG. 4. When the outflow from the main pump decreases, the valve piston initially "creeps" back towards its initial position as shown by curve 73 in FIG. 5 corresponding to the variation in flow area from point (C) to point (e) in FIG. 4.

In order to avoid development of pressure peaks during pump changeover action, all valve port connections are characterized by valve body grooves and piston grooves that are dimensioned to overlap. Such over-dimensioning of the valve passage connections has the advantage that only one safety valve 8 is required between the supply and return conduits connected to the fluid operated device 2. Because of the changeover action of the valve, the dimensional tolerances of the valve passages need not be precise since they do not influence the functioning of the valve within wide limits. Because of the rapid shift of the valve piston 18, operational overlap between the two pumps 3 and 4 is precluded and a constant supply of fluid pressure to the fluid operated device 2 is assured despite the aforementioned over-dimensioning of the valve passages.

Figure 6:
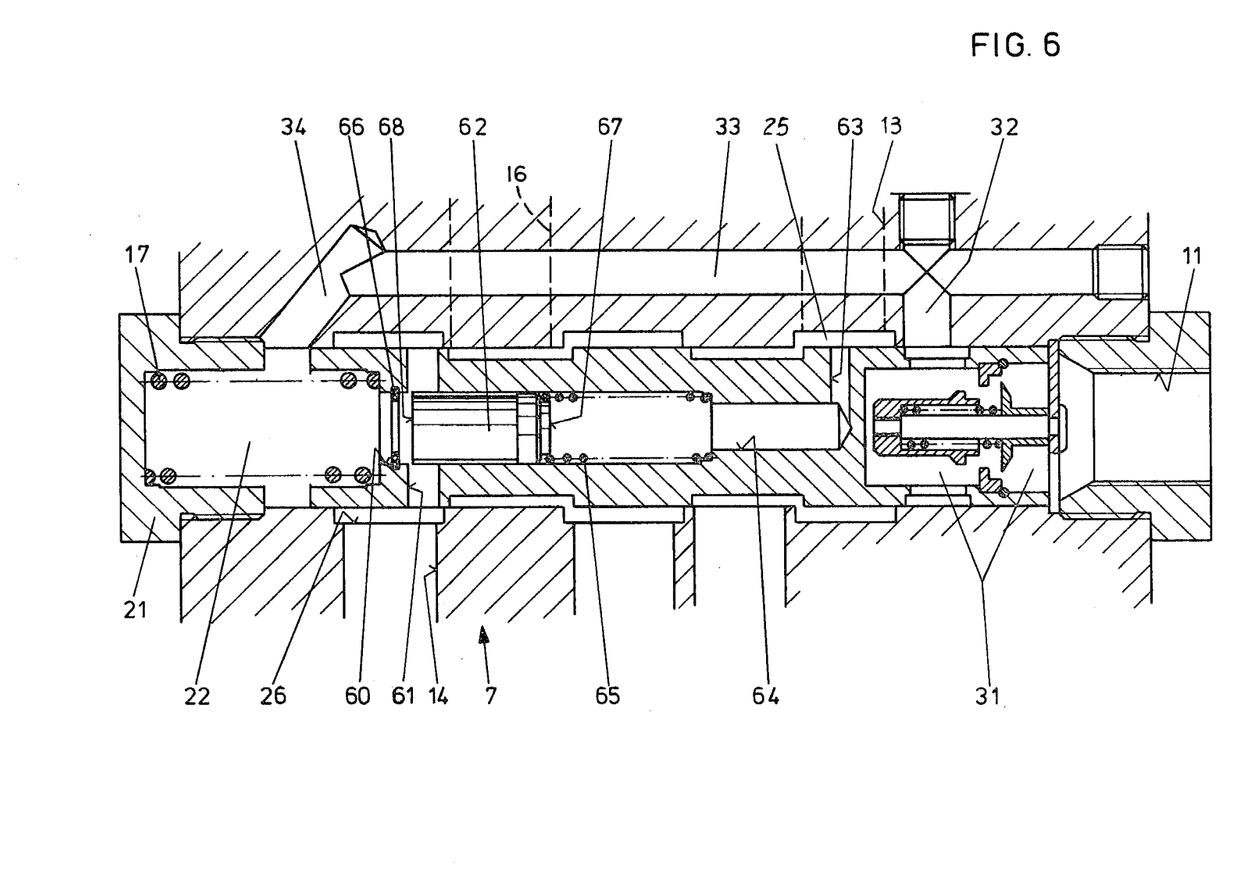
FIG. 6 is a side sectional view through a valve assembly similar to FIG. 2 showing a pressure resistance valve section incorporated therein.

FIG. 6 illustrates the same valve structure as shown in FIG. 2 incorporating therein, however, the pressure resistance valve section 7 schematically depicted in FIG. 1 as part of the valve assembly 1. In the position of the valve piston 18 as shown in FIG. 6, flow from the main pump entering the inlet port connection 11 is conducted through chamber 31, bores 32, 33 and 34, spring chamber 22, axial bore 60, and radial discharge bore 61 in the valve piston to the control groove 26 in the valve body from which the port connection 14 extends to the tank 5 of the main pump. The pressure resistance valve section 7 includes a piston element 62 seated in the axial bore 60 and having an end pressure face 67 exposed to the fluid in the fluid operated device 2 through port connection 13, groove 25 and bores 63 and 64 in the valve piston. The end face 67 is also engaged by a spring 65. Under the force of spring 65 and the fluid pressure in the fluid operated device 2, the piston element 62 may be axially shifted to a limit position engaging a safety ring 66. The outflow of fluid from the main pump will directly return to tank 5 whenever its pressure on the axial end face 68 of the piston element 62 is sufficiently high to cause axial shift of the piston element against the bias of spring 65 and the pressure of the fluid in the fluid operated device 2 opening the discharge bore 61. Therefore, the fluid output pressure of the main pump may increase each time the fluid operated device 2 is disconnected. Such increase in pressure is assured despite considerable wear of the main pump 3, disconnection of the fluid operated device 2 producing pressure drops and continuous shift of the valve between its operative positions.

According to other embodiments of the invention, the restriction control valve assembly 37 as hereinbefore described may be modified for accelerating changes in position of the valve system. For example, the valve assembly 37 could be arranged so that a change in valve position is occasioned by an initial decrease in flow area of the restricted passage in order to initially increase the pressure differential and assure a safe and accelerated valve position change. According to other embodiments, the member 36 associated with the valve assembly 37 could be fixed to the valve body and the support pin 38 carried by the valve piston to reverse the mounting arrangement shown in the illustrated embodiment.

What is claimed is:

1. In combination with at least two pumps (3 and 4) and a fluid operated device (2), a valve assembly (1) connected to said fluid operated device and having a valve piston (18), a valve body (10) and a spring (17) biasing the valve piston to a neutral position, fluid pressure actuating means (31–32) connected to one (3) of the pumps for displacement of the valve piston from said neutral position to a changeover position against the bias of said spring, and flow restriction means (37) interconnecting said one of the pumps to the fluid actuated means for accelerating movement of the valve piston between the neutral and changeover positions at which the valve piston is stabilized under pressure of the pumps, said flow restriction means (37) including a flow orifice member (36) and passage restricting means (39–44) engageable therewith for varying flow area as functions of pressure and valve movement.

2. The combination of claim 1 wherein said flow orifice member and passage restricting means include stepped diameter portions (24, 54, 44, 40, 41).

3. The combination of claim 1 wherein the flow orifice member is fixed to the valve piston and the passage restricting means is supported by the valve body.

4. In combination with at least two pumps (3 and 4) and a fluid operated device (2), a valve assembly (1) connected to said fluid operated device and having a valve piston (18), a valve body (10) and a spring (17) biasing the valve piston to a neutral position, fluid pressure actuating means (31–22) connected to one (3) of the pumps for displacement of the valve piston from said neutral position to a changeover position against the bias of said spring, and flow restriction means (37) interconnecting said one of the pumps to the fluid actuated means including a flow orifice member (36) and passage restricting means (39–44) engageable therewith for varying flow area as functions of pressure and valve movement, said passage restricting means including a support pin (38), a sleeve (39) fixed to the pin having stepped diameter portions (24, 54), a disc (44) axially movable on the pin and spring means (45) supported in the sleeve in engagement with the disc for bias thereof away from the orifice member.

5. The combination of claim 4 wherein the spring means has a spring force relative to that of the spring biasing the valve piston causing initial axial shift of the disc in response to a rise in fluid pressure from said one of the pumps before any axial displacement of the valve piston from the neutral position occurs.

6. The combination of claim 1 wherein said flow area is initially decreased during axial displacement of the valve piston from the neutral position.

7. The combination of claim 6 wherein the flow area is decreased to zero.

8. The combination of claim 1 wherein the passage restricting means has an outer diameter (44) larger than the internal diameter (40) of the orifice chamber.

9. The combination of claim 4 wherein the stepped diameter portion of the sleeve is such that in the axially shifted position of the valve piston, the variable flow area of the restricted passage is larger than that during displacement of the valve piston from the neutral position.

10. In combination with at least two pumps (3 and 4) and a fluid operated device (2), a valve assembly (1) connected to said fluid operated device and having a valve piston (18), a valve body (10) and a spring (17) biasing the valve piston to a neutral position, fluid pressure actuating means (31–22) connected to one (3) of the pumps for displacement of the valve piston from said neutral position to a changeover position against the bias of said spring, flow restriction means (37) interconnecting said one of the pumps to the fluid actuated means for accelerating movement of the valve piston between the neutral and changeover positions at which the valve piston is stabilized under pressure of the pumps, and a pressure resistance valve section (7) connected to said one of the pumps downstream of the flow restriction means for regulating the pressure of said one of the pumps in the neutral position of the valve piston.

11. The combination of claim 10 wherein the pressure resistance valve section is mounted within the valve piston.

12. In a combination including a pair of pumps (3 and 4) supplying pressurized fluid to a fluid operated device (2), a valve assembly (1) for controlling changeover between said pumps, and a valve actuator having a pair of pressure chambers (31 and 22) and restricted passage means connecting said chambers to one (3) of the pumps for developing a differential valve actuating pressure, the improvement residing in flow control means (37) for varying said valve actuating pressure, comprising means (36 and 44) responsive to the pressure of said one of the pumps and displacement of the valve assembly for varying the flow area of said restricted passage means.

13. The combination of claim 12 wherein said flow area varying means includes an orifice member (36), a pair of passage restricting members (43 and 39) means mounting said orifice and passage restricting members for relative displacement in response to said displacement of the valve assembly, and pressure responsive means for displacing said passage restricting members relative to each other prior to displacement of the valve assembly.

* * * * *